United States Patent [19]

Mayer et al.

[11] 4,428,352

[45] Jan. 31, 1984

[54] PROCESS FOR OPERATING AN INTERNAL-COMBUSTION ENGINE WITH A SUPERCHARGER WHICH CAN BE CUT OUT, AND A DEVICE FOR CARRYING OUT THE PROCESS

[75] Inventors: Andreas Mayer, Niederrohrdorf; Martin Schwarz, Moriken, both of Switzerland

[73] Assignee: BBC Brown, Boveri & Co., Ltd., Baden, Switzerland

[21] Appl. No.: 329,994

[22] Filed: Dec. 11, 1981

[30] Foreign Application Priority Data

Dec. 22, 1980 [CH] Switzerland .................. 9453/80

[51] Int. Cl.³ .................. F02B 33/00; F02M 25/06
[52] U.S. Cl. .................. 123/559; 123/564; 123/568
[58] Field of Search .......... 123/559, 569, 564, 568; 60/605, 600, 601, 611

[56] References Cited

U.S. PATENT DOCUMENTS 3,868,822  3/1975  Keller ............................ 60/611
3,925,989  12/1975  Pustelnik ...................... 60/605 X
4,350,013  9/1982  Yoshiba ....................... 123/569 X

FOREIGN PATENT DOCUMENTS 54-19015  2/1979  Japan ............................ 60/611

Primary Examiner—Michael Koczo
Assistant Examiner—Peggy A. Neils
Attorney, Agent, or Firm—Burns, Doane, Swecker and Mathis

[57] ABSTRACT

A process for operating an internal-combustion engine with a supercharger which can be cut out, and a device for carrying out the process are disclosed. The engine has, aside from the supercharger or compressor which can be cut in or out as desired, an exhaust-gas return arrangement. No exhaust gas can be conveyed back into the intake line when the compressor is cut in and therefore when there is a pressure rise at the cylinder inlet to above atmospheric pressure and above the pressure prevailing in an exhaust-gas line. The return of exhaust gas into the intake line is prevented in such a way that an exhaust-gas return line opens, opposite a supercharger delivery line from the supercharger, into an intake line to the engine. A shut-off member is arranged at this junction so that during suction operation of the engine the shut-off member closes the supercharger delivery line and during supercharging operation the shut-off member closes the intake line, above the supercharger delivery line, and the exhaust-gas return line.

2 Claims, 1 Drawing Figure

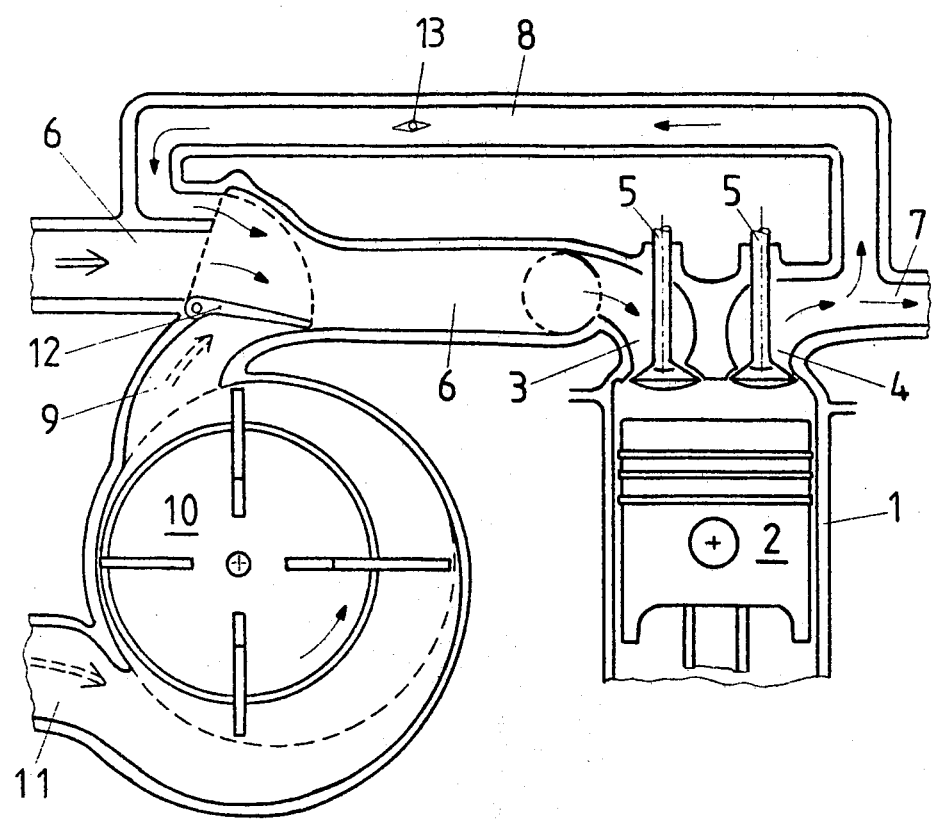

PROCESS FOR OPERATING AN INTERNAL-COMBUSTION ENGINE WITH A SUPERCHARGER WHICH CAN BE CUT OUT, AND A DEVICE FOR CARRYING OUT THE PROCESS

BACKGROUND AND SUMMARY OF THE PRESENT INVENTION

The present invention relates generally to internal combustion engines. More specifically, the present invention relates to a process for operating an internal-combustion engine with a supercharger or compressor which can be cut out, and to a device for carrying out the process.

Increasingly stringent requirements for reducing harmful materials in exhaust gases are imposed on internal-combustion engines, especially those in vehicles. Diesel-type internal combustion engines used as vehicle drives have, in comparison with gasoline engines, lower concentration values of carbon monoxide (CO) and hydrocarbons (HC) in the exhaust gas. However, in diesel engines with optimum consumption, the emissions of nitrogen oxides ($NO_x$) are too high.

These emissions of nitrogen oxides can be reduced by the use of various measures, for example by catalytic oxidation and washing-out, or by the injection of water into the combustion chamber to lower the combustion temperatures, or by returning exhaust gases into the combustion chamber. The combustion temperatures can also be lowered by this last-mentioned measure. Such a returning of exhaust gas can be used both in diesel and in gasoline engines.

Compressors which can be cut in and out of an engine system are known from a publication in "Schnelle Motoren" ["High-speed engines"] by Helmut Hutten (6th revised edition, page 264). These compressors can be cut in and out via a coupling, that is to say, when they are cut out in the case of a low power requirement, the engine already runs in suction operation and, because of its design, has a lower ejection of harmful materials than a non-supercharged engine of the same maximum power.

A primary object of the present invention is to use, on an engine with a compressor which can be cut in, the advantages, known per se, of exhaust-gas return.

The above-mentioned object and other objects of the present invention are achieved, first, by a series of process steps according to the present invention. During idling and under partial load the compressor is cut out and combustion air is sucked in from the atmosphere and part of the exhaust gases is mixed with the stream of intake air via an exhaust-gas return line, a supercharger delivery line of the compressor being closed by a shut-off member. Under higher partial load, and full load, the compressor compresses combustion air from the atmosphere and supplies it to the internal-combustion engine through an intake pipe, while the exhaust-gas return and the intake of air from the atmosphere are interrupted by the shut-off member.

Secondly, the objects of the present invention are achieved by a device according to the present invention, in which an exhaust-gas return line opens, opposite the supercharger delivery line, into the intake line. A shut-off member is arranged so that during suction operation the supercharger delivery line is closed, and during supercharging operation the intake line and the exhaust-gas return line are closed.

Such an arrangment ensures that during idling and under lower partial load and with the compressor cut out, that is to say in a state in which an exhaust-gas return is desired during the intake of air from the atmosphere, this return can take place. On the other hand, by actuating the shut-off member, with the compressor cut in, under a higher partial load and full load, when an exhaust-gas return is not required, this return can be prevented in a simple way. The shut-off member is actuated automatically when the compressor is either cut in or cut out. With the compressor cut out, the shut-off member will close the supercharger delivery line and open the intake line and the exhaust-gas return line. When compressed air is supplied to the engine, that is to say when the compressor is cut in, the shut-off member automatically opens the supercharger delivery line and closes the intake-air line and the exhaust-gas return line.

BRIEF DESCRIPTION OF THE DRAWINGS

A preferred embodiment of an internal-combustion engine and supercharger arrangement according to the present invention is described with reference to the accompanying drawing which is a schematic view of the arrangement according to the present invention illustrated in a simplified manner.

DETAILED DESCRIPTION OF THE PREFERRED EMBODIMENT

With reference to the drawing, a preferred embodiment of an internal combustion engine according to the present invention includes a cylinder 1 and a piston 2. An intake pipe 3 and an exhaust pipe 4 with associated valves 5 are located at a head of the cylinder 1. An intake line 6 and an exhaust-gas line 7 open into the intake and exhaust pipes 3, 4 respectively. An exhaust-gas return line 8 branches off from the exhaust-gas line 7 and opens into the intake line 6. A supercharger delivery line 9 of a compressor 10, which sucks in combustion air via an air inflow pipe 11, also opens approximately opposite the junction of the exhaust-gas return line 8 with the intake line 6.

A shut-off member 12, preferably designed as a non-return flap, is provided at the junction of the supercharger delivery line 9 and the exhaust-gas return line 8. The shut-off member 12 is designed so that by the use of it the intake line 6 and the exhaust-gas return line 8 are closed simultaneously. An actuating device (not illustrated) operates the shut-off member 12. Thus, the shut-off member can serve, at the same time, as a cut-in device for the compressor 10, so that during supercharging operation the internal-combustion engine receives combustion air via the supercharger delivery line 9 only. When the shut-off member 12 is closed, the flow of compressed air into the exhaust-gas return line 8 and into the part of the intake line 6 located in front of the junction is also prevented as a result.

When the compressor 10 is cut out, the shut-off member 12 opens the intake line 6 and the exhaust-gas return line 8, while at the same time, the supercharger delivery line 9 is shut off. In the exhaust-gas return line 8 is located a throttle flap 13 which is preferably controlled via an accelerator pedal (not illustrated). During the starting procedure, the exhaust-gas return that occurs with the intake line 6 open, can be prevented if desired by the throttle flap 13. Under partial load, and again with the engine in suction operation, an additional fine regulation of the exhaust-gas return quantity is also made possible by the throttle flap 13.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention.

What is claimed is:

1. A process for operating an internal-combustion engine with a supercharger which can be cut out, comprising:

closing a supercharger delivery line of the supercharger which line opens into an intake pipe by a shut-off member during idling and under low partial load operation of the engine, and, while the supercharger is cut out, sucking intake air in from the atmosphere and mixing a part of the exhaust gases delivered in an exhaust gas return line with the stream of intake air, and supplying the mixture of intake air and exhaust gases to the internal-combustion engine through the intake pipe; and interrupting the flow of both the exhaust gases and the intake air from the atmosphere with the shut-off member during upper partial load and full load operation of the engine and compressing air from the atmosphere with the supercharger and supplying the compressed air to the internal-combustion engine through the intake pipe.

2. In a device for operating an internal-combustion engine with a supercharger which can be cut out, wherein the supercharger is connected to an intake line of the engine through an exit mouth of a supercharger delivery line, the improvement comprising:

an exhaust-gas return line having an exit mouth opening into the intake line at generally the same cross section of the intake line as the exit mouth of the supercharger delivery line; and a shut-off member having first and second positions, means for moving said shut-off member to the first position during idling and partial load operation of the engine to close the mouth of the supercharger delivery line and to the second position during upper partial load and full load operation of the engine to simultaneously close both the intake line upstream of the supercharger delivery line and the exit mouth of the exhaust-gas return line.

* * * * *